Figure 1:
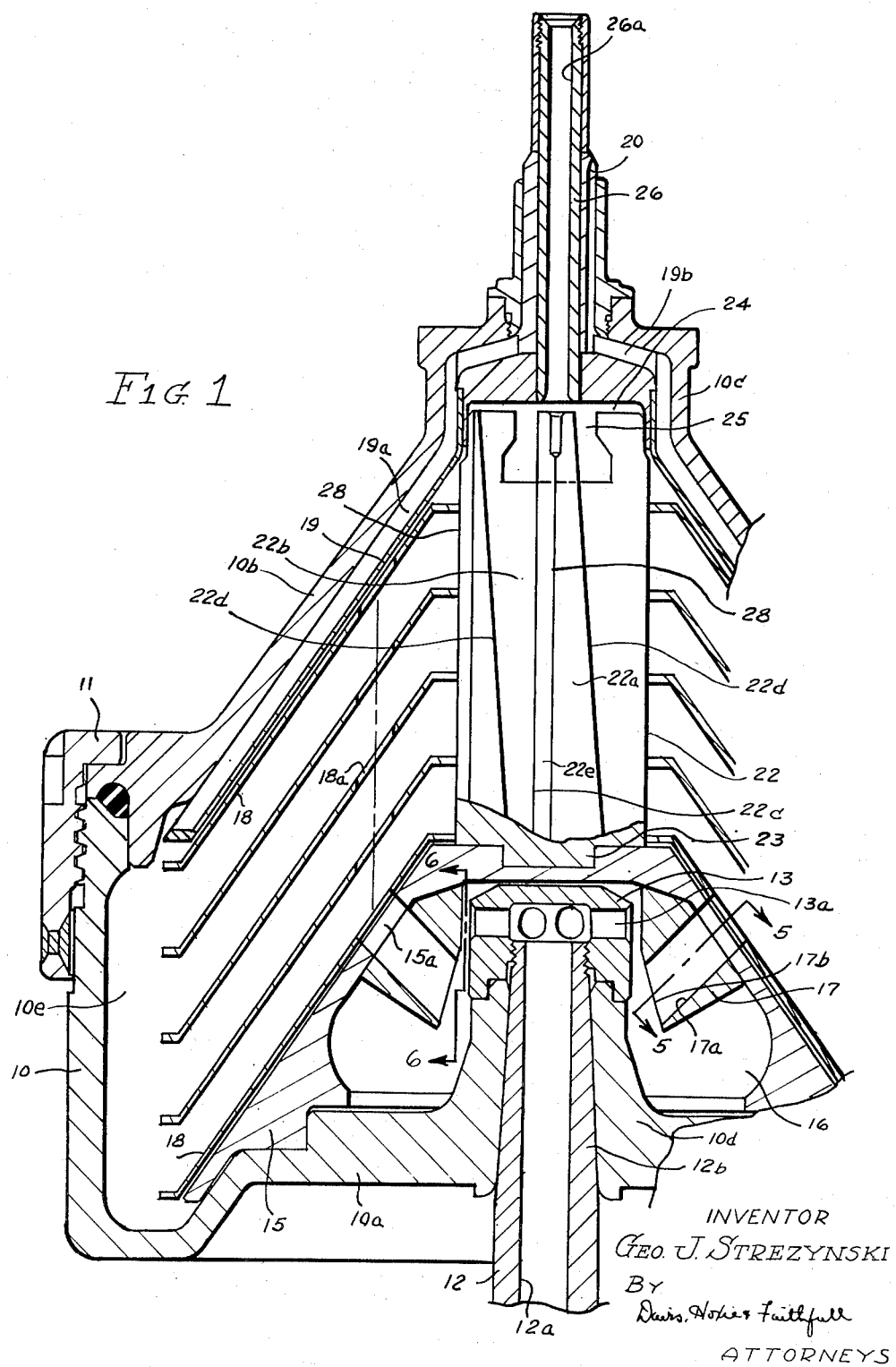

April 22, 1952     G. J. STREZYNSKI     2,593,934
CENTRIFUGE FOR SEPARATING CREAM FROM COLD MILK PRODUCTS
Filed Oct. 20, 1949     2 SHEETS—SHEET 2

INVENTOR
GEO. J. STREZYNSKI
BY
Davis Hoxie Faithfull
ATTORNEYS

Patented Apr. 22, 1952

2,593,934

UNITED STATES PATENT OFFICE 2,593,934

CENTRIFUGE FOR SEPARATING CREAM FROM COLD MILK PRODUCTS

George J. Strezynski, Poughkeepsie, N. Y., assignor to The De Laval Separator Company, New York, N. Y., a corporation of New Jersey Application October 20, 1949, Serial No. 122,413

17 Claims. (Cl. 233—46)

This invention relates to centrifugal separators, and more particularly to a novel centrifugal bowl adapted especially for separation of cream from a cold milk product.

In the centrifugal separation of cream from milk, it is well known that the separated cream, when it is cold and therefore quite viscous, tends to agglomerate in the centrifugal bowl and form very stiff masses known as "cream plugs," which quickly clog or block the discharge path for the cream. This clogging effect is particularly pronounced, of course, when separating cream of high fat content. To prevent or reduce the clogging effect, it has been necessary heretofore to heat the milk (or low fat content cream) passing to the centrifugal separator, whereby the viscosity of the separated cream is reduced by virtue of its high temperature. However, the heating of the milk product to be separated is objectionable in many instances, due principally to the necessity for additional equipment and power, and the time factor involved.

The present invention has for its principal object the provision of an improved centrifugal bowl for separating cream, or the like, without heating the feed to the bowl and without clogging the bowl.

In a centrifugal bowl made according to the invention, the separating chamber is provided with an inlet leading to a set of conical discs in the chamber, the discs being spaced apart to provide spaces where the centrifugal separation occurs. The discs surround a center post or tubular shaft extending vertically along the rotation axis of the bowl. The separated cream, being the lighter component, is displaced inwardly from the disc spaces to the tubular shaft, while the skim milk passes outward from the discs and is discharged from the bowl through a suitable outlet. The tubular shaft is provided with a plurality of cream channels which are gradually and continuously enlarged from the base portion of the shaft to its top portion, each channel thus forming an upwardly flaring discharge passage leading to a cream outlet in the bowl. Each flaring channel, moreover, is inclined upwardly toward the rotation axis of the bowl and also in the direction of rotation, and is partly formed by a trailing vane which acts as a pump to facilitate upward movement of the cream along the channel. With this construction, liquid pressures within the bowl due to "run ahead" or throughput rate are diverted upwardly along the tubular shaft by the inclined and upwardly flaring cream passages therein, and the trailing vanes act as pumps to facilitate upward movement of the cream along the flaring passages to the cream outlet.

In the preferred construction, the tubular shaft has generally flat lateral faces, each of which is formed with one of the upwardly flaring cream passages, and these passages communicate at their upper ends with an axial pipe forming a central passage for discharging the cream through the neck of the bowl. The corners formed by adjacent lateral faces of the tubular shaft may then be used for locating the conical discs through which the tubular shaft extends, the discs being formed with notches adapted to receive the shaft corners.

I have found that the tendency for the relatively low temperature cream to plug the bowl may be reduced still further by providing below the flaring cream passages a series of impellers through which the milk product to be separated is delivered to the separating chamber in the bowl. Preferably, the bowl is provided with a central feed chamber below the tubular shaft and with impeller passages extending generally radially outward through the periphery of the feed chamber from a region located a substantial distance inwardly from this periphery. Thus, a body of the milk product is retained in the feed chamber outside the entrances to the impeller passages, the liquid overflowing the inner ends of these passages and being impelled centrifugally into the disc spaces. In this way, the milk product is introduced into the separating chamber with relatively small turbulence but with sufficient pressure to force the separated cream upwardly along the inclined and flaring cream passages in the tubular shaft, under the pumping action of the trailing vanes.

Figure 2:
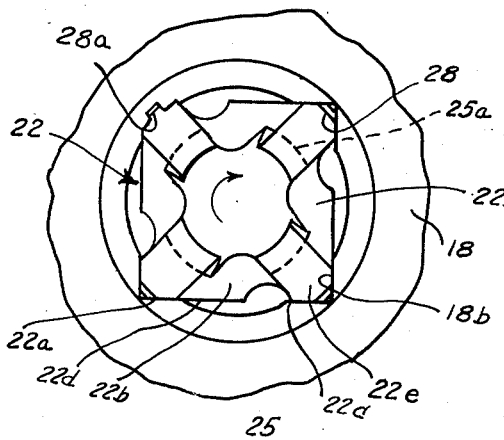
Figure 5:
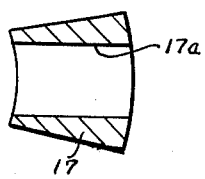
Figure 3:
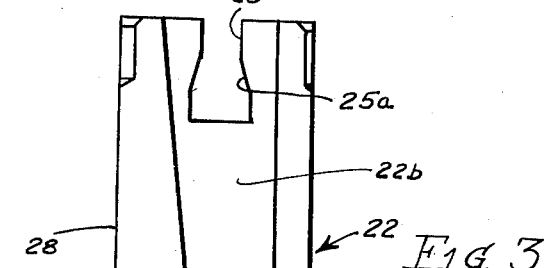
Figure 6:
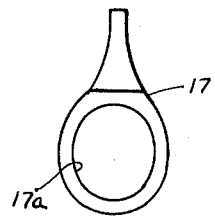
Figure 4:
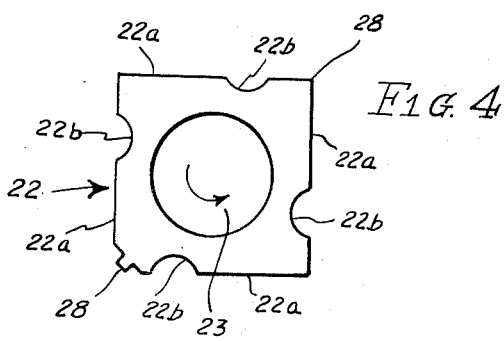

For a better understanding of the invention, reference may be had to the accompanying drawings, in which Fig. 1 is a vertical sectional view of a preferred form of a centrifugal bowl embodying the invention;

Figs. 2, 3 and 4 are top, side and bottom views, respectively, of the tubular shaft or center post, and Figs. 5 and 6 are sectional views on the lines 5—5 and 6—6, respectively, in Fig. 1, illustrating one of the devices forming the impeller passages from the feed chamber to the separating chamber.

Referring to the drawings, the numeral 10 designates a centrifugal bowl having a bottom 10a and a generally conical top 10b terminating in a bowl neck 10c. As shown, the top 10b and its neck 10c are made in a single piece which is secured to the main part or shell of the bowl by a threaded ring 11. The bowl is rotatably mounted on and driven by a hollow spindle 12 having a central feed passage 12a through which the milk product to be separated is delivered to the bowl. At its upper end portion 12b, the spindle 12 is tapered and fits into a correspondingly tapered socket in a central upstanding boss 10d on the bowl bottom. The spindle projects upwardly through the top of the boss 10d and has a nut 13 threaded on its upper end to hold the bowl down against the tapered part 12b of the spindle. The nut 13 is formed with radial passages 13a leading outwardly from the upper end of the feed passage 12a in the spindle.

A generally conical nave 15 is mounted centrally in the bowl on the bottom 10a and forms with the latter and the boss 10d a central annular feed chamber 16 into which the milk product is delivered from the nut passages 13a. Secured to the outer or peripheral wall of the chamber 16, as by welding, are impeller devices 17 provided with elongated impeller passages 17a. Each passage 17a is aligned with a hole 15a extending through the outer wall of the nave. Each impeller device 17 forms an elongated passage extending generally radially outward through the side wall or periphery of the feed chamber 16 from a region located a substantial distance inwardly from the periphery of this chamber. As shown, the passages 17a are inclined upwardly and outwardly, and the entrance end 17b of each passage is inclined upwardly and inwardly toward the rotation axis of the bowl. The impeller passages 17a form inlet openings for feeding the milk product to the separating chamber of the bowl, which will now be described.

The separating chamber of the bowl is provided with a nest of conical discs 18 resting upon the conical surface of the nave 15. The discs 18 are spaced apart, as by means of the usual spacing buttons, to provide conical spaces in which the centrifugal separation is effected. Feed holes 18a in the discs are aligned with the outlet ends of the impeller passages 17a (the nave holes 15a) and allow the incoming milk product to pass into the spaces between the discs. The skim milk separated between the discs, being the heavier component, moves outwardly to a peripheral space 10e of the separating chamber, from which it is discharged upwardly through passages 19a formed between the bowl top 10b and a top disc 19. The discharging skim milk from the passages 19a flows inwardly through generally radial connecting passages 19b to a suitable outlet 20.

A tubular shaft or center post 22 is secured on top of the nave 15 so that it is centered on the rotation axis of the bowl. The tubular shaft is located by a bottom projection 23 which fits into a recess in the top of the nave, the tubular shaft extending upwardly from the nave through central openings in the separating discs 18. As shown particularly in Figs. 2, 3 and 4, the tubular shaft 22 has flat lateral faces 22a, each of which is formed with a vertical cream channel 22b. Each cream channel is gradually and continuously enlarged from the base portion of the tubular shaft to its top portion, the enlargement being effected by a gradual increase in both the depth and the width of the channel. Each channel 22b has a lagging edge 22c (reckoned in the direction of rotation of the bowl) which is parallel to the rotation axis of the bowl, and has a leading edge 22d which diverges upwardly from the lagging edge and is inclined toward the direction of rotation. As shown in Figs. 2 and 4, each channel 22b at the base portion of the tubular shaft is located nearer to the lagging edge than to the leading edge of the corresponding lateral face 22a of the tubular shaft. However, at the top portion of the tubular shaft, where each channel is of maximum size, the channel is centered between the leading and lagging edges of the corresponding lateral face 22a. Thus, each flaring channel 22b is inclined upwardly toward the rotation axis of the bowl, due to the increasing depth of the channel, and also in the direction of rotation of the bowl, due to the divergence of the leading edge 22d with respect to the lagging edge 22c. Moreover, each flaring channel 22b is defined at one side by a lagging vane 22e which acts as a pump to facilitate upward movement of the cream along the channel.

Between the top of the tubular shaft 22 and the overlying part of the bowl neck is a clearance space 24 through which the separated cream can pass from the upper ends of the channels 22b to a central pipe 26 in the bowl neck. The pipe 26 provides an axial discharge passage or outlet 26a for the cream.

The upper part of the tubular shaft 22 is hollow and is provided with vertical slots 25 which are undercut, as shown at 25a. Thus, when the bowl top 10b is removed from the main part of the bowl, a suitable tool may be inserted in the top of the tubular shaft and rotated to engage the undercut portion 25a, whereby the tubular shaft may be lifted from the bowl bottom by the tool, along with the nave and discs.

The corners 28 formed by adjacent lateral faces 22a of the tubular shaft are utilized for locating the conical discs 18. More particularly, each disc 18 is provided adjacent its central opening with notches 18b which receive the corners 28. One of the corners 28 may be flattened and provided with a spline 28a to engage in a correspondingly notched part of each disc, to insure that the discs are properly located angularly in the bowl with respect to the tubular shaft.

In the operation of the bowl, the milk product from which the cream is to be separated may be fed at low temperature (that is, without previous heating) through the rotating spindle 12 into the feed chamber 16, where a body of the liquid accumulates outside the entrance ends 17b of the impeller passages 17a. Due to the inclination of the passage ends 17b, the liquid overflows these ends uniformly and smoothly. The overflow liquid is then impelled centrifugally through the passages 17a so that it enters the separating chamber under a considerable pressure head but with relatively little turbulence. The cream separated between the discs 18 is forced radially inward to the tubular shaft 22, where it enters the channels 22b.

Because of the gradual enlargement of the channels 22b in the upward direction, they provide smooth flaring paths along which the separated cream is forced upwardly for discharge through the outlet 26a. This upward movement of the cream is facilitated partly by the upward inclination of the channels 22b toward the rotation axis, since the pressure exerted radially inward by the cream against the surface of each channel results in an upward thrust component due to this inclination of the channel. The upward movement of the cream is further facilitated by the upward inclination of the channels 22b toward the direction of rotation (as indicated by the arrows in Figs. 2 and 4). The reason for this is that the cream in the region of the tubular shaft 22 undergoes a "run ahead" action by rotating at a greater angular speed than the bowl itself. In other words, the cream entering each channel 22b is rotating in the same direction as the channel but at a higher angular speed, so that the upward inclination of the channel toward the direction of rotation tends to force the cream upwardly along the channel. The trailing vanes 22e act to maintain the cream, after it has entered the channels 22b, in rotation with at least the angular speed of the bowl, thereby exerting a pumping action which aids in the free and continuous discharge of the cream.

The impeller devices 17 cooperate with the tubular shaft channels 22b by building up a liquid pressure head which not only increases the pressure exerted radially inward by the cream against the surface of each channel 22b but also increases the "run ahead" of the cream in the region of the tubular shaft.

I claim:

1. In a centrifugal separator adapted especially for the separation of cream from cold milk products, and which includes a rotatable bowl having a separating chamber, an inlet opening for feeding the milk product to said chamber, and an outlet opening communicating with the peripheral part of the chamber for discharging separated skim milk therefrom, and a series of conical discs spaced apart in the separating chamber, the improvement which comprises a tubular shaft in the bowl extending vertically through the discs along the rotation axis of the bowl and having a plurality of generally vertical cream channels each of which is gradually and continuously enlarged from the base portion of the shaft to its top portion, said channels thereby forming upwardly flaring discharge passages surrounded by the discs, the bowl having at its upper portion a cream outlet communicating with the upper ends of the flared passages.

2. The improvement according to claim 1, in which each flaring channel is inclined upwardly toward the rotation axis of the bowl and also in the direction of rotation.

3. The improvement according to claim 1, in which each flared channel is partly defined by a vane extending generally vertically along the trailing side of the channel, reckoned in the direction of rotation of the bowl.

4. The improvement according to claim 1, in which both the width and the depth of each flared channel increase progressively from the base portion to the top portion of the tubular shaft.

5. The improvement according to claim 1, in which the trailing edge of each channel is parallel to the rotation axis of the bowl, the leading edge of each channel diverging upwardly from said trailing edge.

6. The improvement according to claim 1, in which the trailing edge of each channel is parallel to the rotation axis of the bowl, the leading edge of each channel diverging upwardly from said trailing edge, each channel increasing progressively in both width and depth from the base portion to the top portion of the tubular shaft.

7. The improvement according to claim 1, in which both the width and the depth of each flared channel increase progressively from the base portion to the top portion of the tubular shaft, the bottom of each channel being inclined upwardly toward the rotation axis of the bowl and also toward the direction of rotation of the bowl.

8. The improvement according to claim 1, in which the tubular shaft has lateral faces which are generally flat except for said channels, each face having one of said channels.

9. The improvement according to claim 1, in which the tubular shaft is provided with generally flat lateral faces each having one of said flaring channels, the lower end of each channel being nearer to the lagging edge than to the leading edge of the corresponding face, and the upper end of each channel being approximately centered between said last edges.

10. The improvement according to claim 1, in which the tubular shaft has lateral faces which are generally flat except for said channels, each face having one of said channels, the lagging edge of each channel and face being parallel to the rotation axis of the bowl, and the leading edge of each channel diverging upwardly from said lagging edges and converging upwardly toward the leading edge of the corresponding face, each channel being of progressively increasing depth from the base portion to the top portion of the tubular shaft.

11. The improvement according to claim 1, in which the tubular shaft has lateral faces which are generally flat except for said channels, each face having one of said channels, the conical discs having notches to receive a corner formed by adjacent lateral faces of the tubular shaft.

12. The improvement according to claim 1, in which the bowl also has a central feed chamber below the tubular shaft, there being a plurality of inlet openings from the feed chamber to the separating chamber, each inlet opening being an elongated impeller passage extending generally radially outward through the periphery of the feed chamber from a region located a substantial distance inwardly from said last periphery.

13. The improvement according to claim 1, comprising also a hollow nave on the bottom of the bowl forming a central feed chamber and supporting the tubular shaft on top of the nave, there being a plurality of inlet openings from the feed chamber to the separating chamber, each inlet opening being an elongated impeller passage extending generally radially outward through the periphery of the feed chamber from a region located a substantial distance inwardly from said last periphery.

14. The improvement according to claim 1, comprising also a hollow nave on the bottom of the bowl forming a central feed chamber and supporting the tubular shaft on top of the nave, there being a plurality of inlet openings from the feed chamber to the separating chamber, each inlet opening being an elongated impeller passage extending generally radially outward through the periphery of the feed chamber from a region located a substantial distance inwardly from said last periphery, the nave having a conical side wall supporting said discs.

15. The improvement according to claim 1, in which each flaring channel is inclined upwardly toward the rotation axis of the bowl and also toward the direction of rotation, the improvement also comprising an impeller device in the bowl acting upon said milk product to introduce it into the separating chamber under a substantial pressure head.

16. In a centrifugal separator adapted especially for the separation of cream from cold milk products, and which includes a rotatable bowl having a separating chamber, an inlet opening for feeding the milk product to said chamber, and an outlet opening communicating with the peripheral part of the chamber for discharging separated skim milk therefrom, and a series of conical discs spaced apart in the separating chamber, the improvement which comprises a tubular shaft in the bowl extending vertically through the discs along the rotation axis of the bowl and having a plurality of generally vertical cream channels each of which extends from the base portion of the shaft to its top portion with an inclination upward in the direction of rotation of the bowl, whereby movement of the cream in the region of the shaft at a greater angular speed than the shaft causes the channels to exert an upward force on the cream therein, the bowl having at its upper portion a cream outlet communicating with the upper ends of the inclined channels.

17. In a centrifugal separator adapted especially for the separation of cream from cold milk products, and which includes a rotatable bowl having a separating chamber, an inlet opening for feeding the milk product to said chamber, and an outlet opening communicating with the peripheral part of the chamber for discharging separated skim milk therefrom, and a series of conical discs spaced apart in the separating chamber, the improvement which comprises a tubular shaft in the bowl extending vertically through the discs along the rotation axis of the bowl and having a plurality of generally vertical cream channels each of which is gradually and continuously enlarged upward to the top portion of the shaft, said channels thereby forming upwardly flaring discharge passages in the upper portion of the shaft surrounded by the discs, the cross-sectional area of each of said discharge passages being substantially greater at the top of the shaft than at the intermediate portion of the shaft, the bowl having at its upper portion a cream outlet communicating with the upper ends of the flared passages.

GEORGE J. STREZYNSKI.

REFERENCES CITED

The following references are of record in the file of this patent:

UNITED STATES PATENTS

| Number | Name | Date |
|---|---|---|
| 1,096,000 | Wilford | May 5, 1914 |
| 1,916,870 | Strezynski | July 4, 1933 |
| 2,214,831 | Hall | Sept. 17, 1940 |

FOREIGN PATENTS

| Number | Country | Date |
|---|---|---|
| 80,155 | Sweden | Apr. 17, 1934 |